ary Examiner—C. W. Lanham
United States Patent [19]
Fredriksson

[11] 4,134,256
[45] Jan. 16, 1979

[54] COUPLING UNIT

[75] Inventor: Lars O. A. Fredriksson, Vaxjo, Sweden

[73] Assignee: K A Bergs Smide AB, Gemla, Sweden

[21] Appl. No.: 777,020

[22] Filed: Mar. 14, 1977

[30] Foreign Application Priority Data

Mar. 19, 1976 [SE] Sweden .............................. 76030675

[51] Int. Cl.² ............................................. F16G 15/04
[52] U.S. Cl. ...................................................... 59/93
[58] Field of Search .................... 59/93, 86; 294/82 R; 24/230.5 R

[56] References Cited

U.S. PATENT DOCUMENTS

| 3,044,521 | 7/1962 | St. Pierre | 24/230.5 R |
| 3,261,636 | 7/1966 | St. Pierre | 59/86 |
| 3,280,438 | 10/1966 | Luketa | 24/230.5 R |
| 3,962,755 | 6/1976 | Buschini | 59/86 |
| 3,974,641 | 8/1976 | Rieger | 59/93 |

FOREIGN PATENT DOCUMENTS 539798 9/1973 Switzerland .............................. 59/93

Primary Examiner—C. W. Lanham
Assistant Examiner—Gene P. Crosby
Attorney, Agent, or Firm—Hubbell, Cohen, Stiefel & Gross

[57] ABSTRACT

A coupling unit comprises in combination (A) a substantially U-shaped shackle having two opposing, apertured shanks and a removable spindle which extends through the shank apertures, and (B) an eye member, such as a hook, which has at least one flattened portion, whose smallest dimension is smaller than the distance between the shanks of the shackle for permitting the eye member to be coupled to the shackle.

6 Claims, 6 Drawing Figures

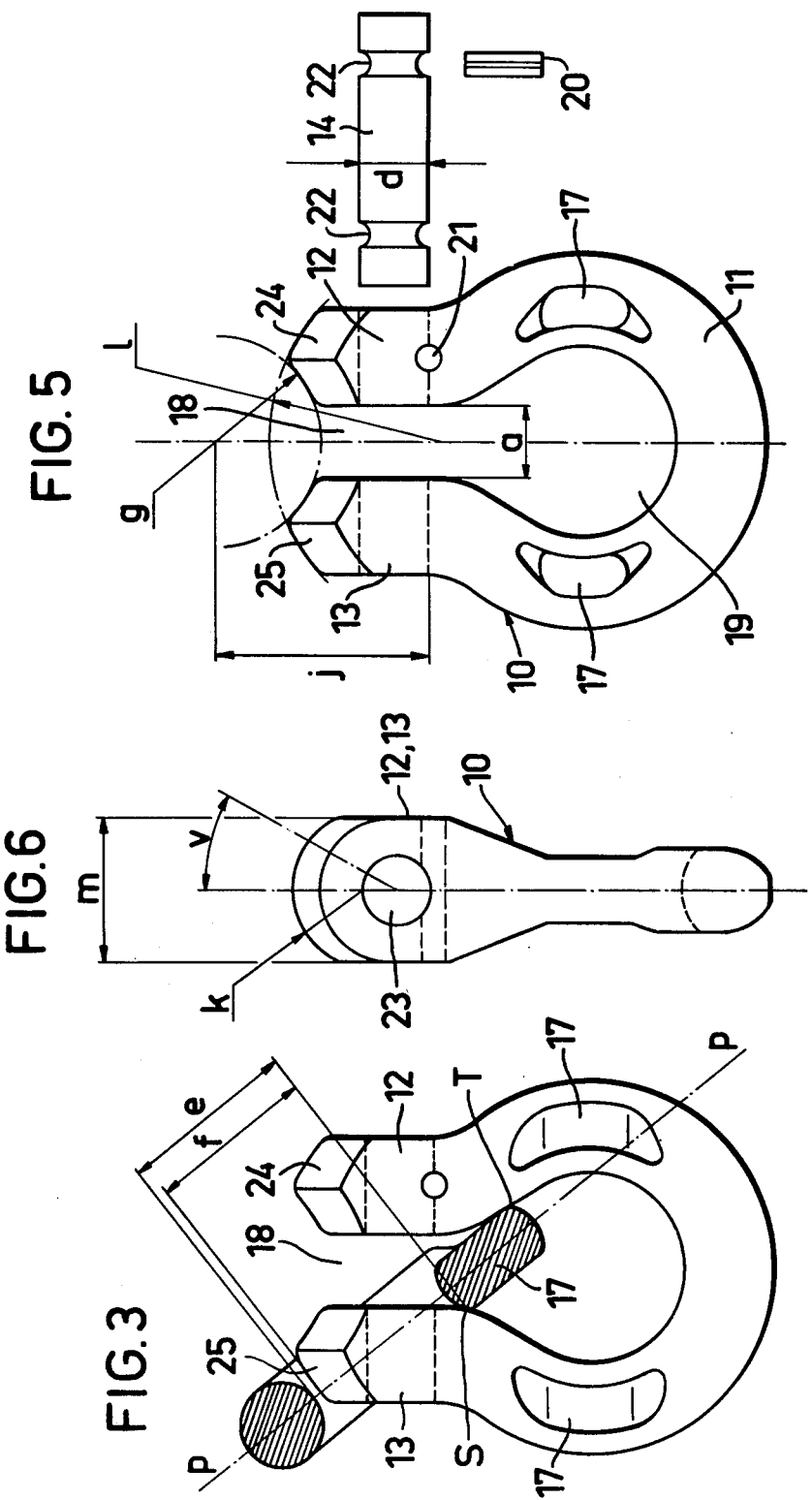

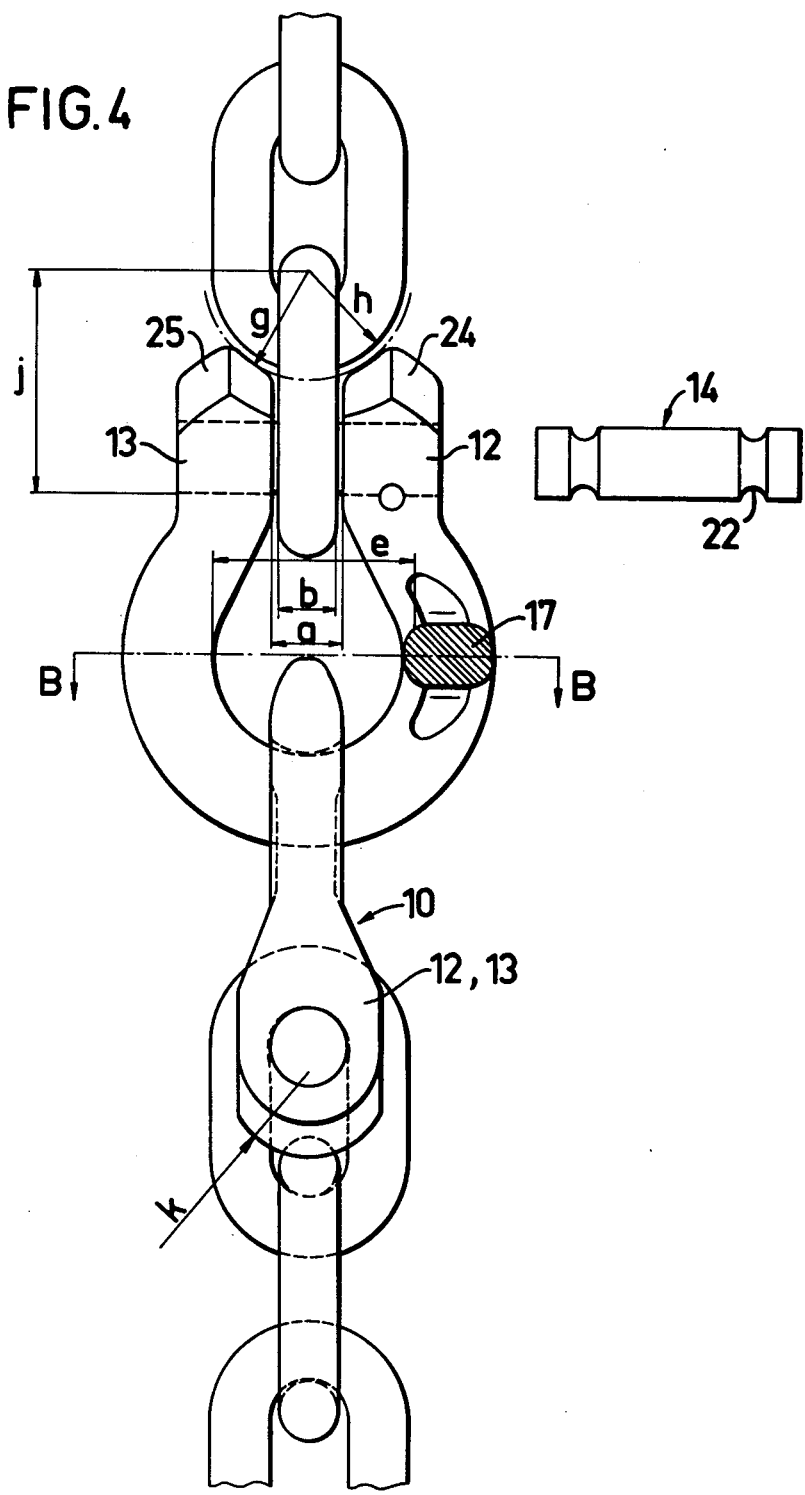

COUPLING UNIT

BACKGROUND OF THE INVENTION

This invention relates to a coupling unit of the general type which comprises a hook or a similar member having an at least substantially closed eye, and a substantially U-shaped shackle or U-bolt, which is adapted to be coupled to an end link of a chain and has two opposing shanks or ears which are coupled together by a removable bolt, spindle or the like which extends through registering apertures in the shanks, the mutual distance between the shanks and their shape as well as the cross dimensions of the spindle being so interrelated, that the shackle is connectable only to a link, whose dimensions lie between predetermined, preferably standardized limits.

In the utilization of a chain for lifting and securing purposes as well as in other conjunctions, the chain is as a rule used together with some kind of fitting, such as a hook, an attachment eye member or the like which is connected to the end link of the chain. This coupling together is usually brought about by means of a coupling link, e.g. a link according to the Swedish Pat. No. 211 934, or a shackle, e.g. according to Swedish standard SMS 1577. To give the complete lifting tool, comprising chain, coupling member and fitting (e.g. a hook) a correct maximum working load permitted, the individual maximum working load permitted of each component has to be observed by itself, and the lowest maximum working load permitted will be determinative of the maximum working load permitted of the complete lifting tool. When other persons than experts make such a coupling, it may therefore happen that components having substantially differing maximum permitted working loads become connected together, which entails a great danger of overloading the weakest component and a consequent risk of accidents.

SUMMARY OF THE INVENTION

It is the object of this invention to eliminate the above drawbacks by making impossible coupling together chains and fittings having differing lifting capacities. This object is attained thanks to the fact that the eye has at least one local or extended, flattened portion, the smallest dimension of which is smaller than the distance between the shanks of the shackle, so that the flattened portion subsequent to the removal of the spindle of the shackle may be introduced between the shanks substantially beyond them, the opening of the eye being then threadable upon one shackle ear for accomplishing coupling together of shackle and eye.

Further features and advantages of the coupling unit according to the invention will become apparent from the following detailed description and the annexed drawings which diagrammatically and as non-limiting example illustrate an embodiment of the invention, which is preferred at present.

BRIEF DESCRIPTION OF THE DRAWING

FIG. 3 illustrates the introduction of a shackle into the eye of a fitting, the eye being shown in the transverse dimension A—A according to FIG. 2 or B—B according to FIG. 4.

FIG. 4 illustrates a composite chain-shackle-shackle-chain-coupling.

FIG. 5 is a partly perspective plan view of a shackle with its appurtenant spindle or stud and locking pin shown separately.

FIG. 6 is a side view of the shackle corresponding to FIG. 5.

DESCRIPTION OF THE PREFERRED EMBODIMENTS

Figure 1:
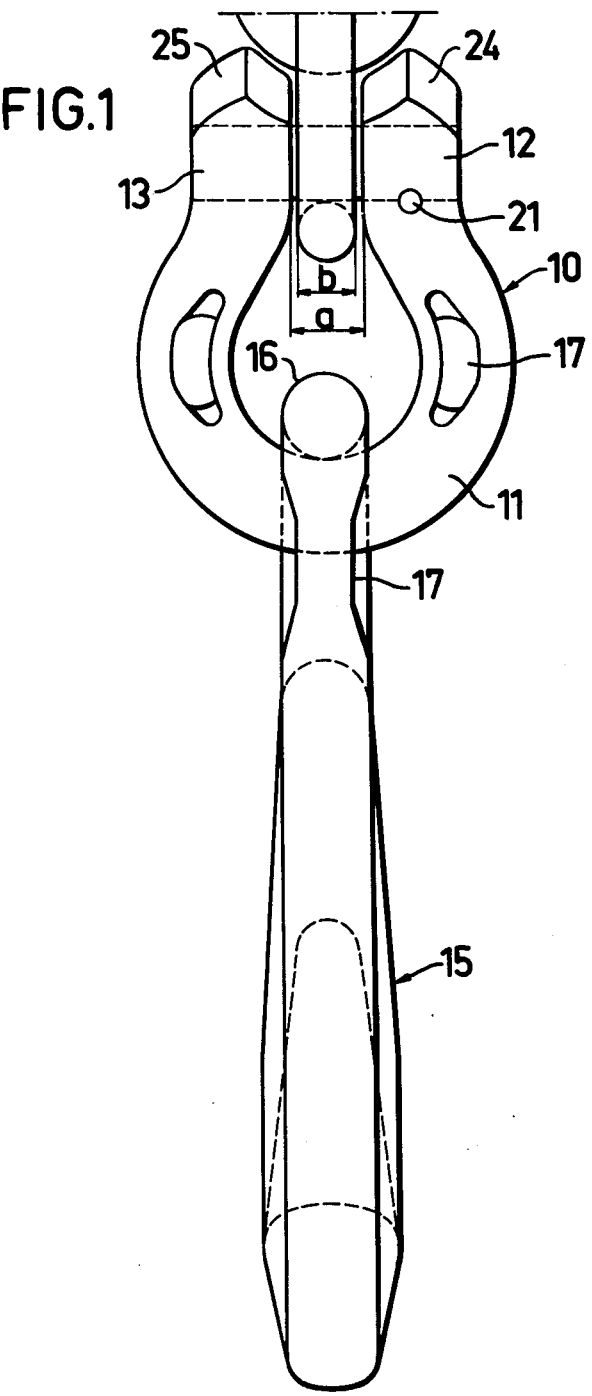
FIG. 1 illustrates a chain coupled to a shackle which is connected to the eye of a fitting which in this case is comprised of a hook.

The invention relates to the coupling of a fitting, such as a hook, a lifting eye or the like, to the end link of a chain by means of a shackle 10. This comprises a bent or curved portion 11 (FIG. 5) which terminates in a shank or an ear 12, 13 at each end. The inner sides of the ears which face each other define an entrance opening 18 which widens and leads into a vacant space 19 bordered by the arcuate portion 11. The vacant space 19 may be circular or have another shape. The ears 12 and 13 which may be of different length are provided with coaxial apertures 23 (FIG. 6) to fit a common spindle or stud 14. The spindle 14 may be held in place passing through both ears 12, 13 by means of one or more locking pins 20 which are pressed in into transverse bores 21 in the ears and each fit into individual waists 22 in the spindle 14. Other ways of locking the spindle are also feasible. Thus, the spindle may be made e.g. in the shape of a threaded bolt, which is pushed in through the aperture 23 in one ear and is threaded into a nut on the outside of the other ear. By dimensioning the width a of the entrance opening 18 between the ears 12, 13 in such a way, that it is just a little wider than the diameter b of the material (metal) of the chain, it is prevented that a chain which is designed for a greater maximum load than the shackle 10 and has a diameter of the material which is greater than the width a of the entrance opening, can be coupled to the shackle 10.

By dimensioning the diameter d of the spindle 14 in such a way, that it is just a little smaller than the internal width c of the chain link (FIG. 2) it is on the other hand prevented that a chain, which is too small and too weak and in which the internal width c of the links is smaller than the diameter of the spindle 14, can be coupled to the shackle 10.

Furthermore, the upper portions 24, 25 of the ears (FIGS. 4–6) having the measure j and the radii g and k are adapted to the internal length and radius h (FIG. 4) in such a manner that for the link adjacent to the end link there will become a very minute clearance to the upper portions 24, 25 (FIG. 4) of the ears when the chain and the shackle hang straight down and take a common plumb line as well as in every position when the chain is rotated in a plane, which is perpendicular to the spindle 14 (FIG. 5) through an angle of at least 90° in either direction from the plumb line of the shackle. The angle is designated v in FIG. 6. This makes it possible for the end link of the chain to become freely pivoted in both directions on the spindle 14 of the shackle. Thanks to the described design of the upper portions 24, 25 of the ears, a chain having smaller dimensions and shorter links than the chain intended for cooperation with the shackle 10 can not reach sufficiently deep down between the ears 12, 13 of the shackle to surround the spindle 14.

By adapting the measures a, d, g, j and k to the intended chain dimension as described, the possibility of coupling heavier as well as finer chains than the intended one to the shackle is excluded.

Figure 2:
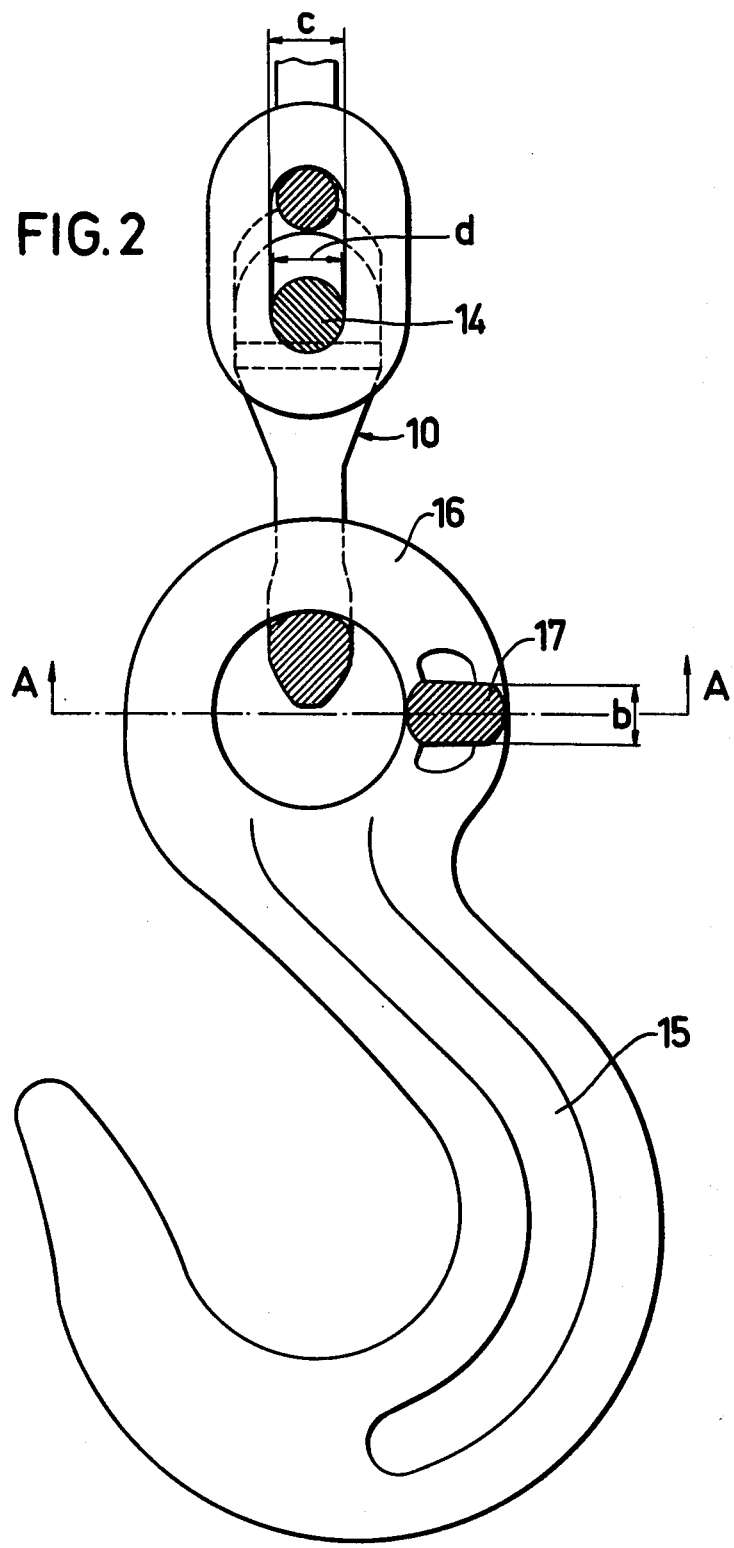
FIG. 2 is a side view of the unit according to FIG. 1.

The shackle 10 is intended to be coupled to a fitting which is provided with an eye which, according to the invention, has a well defined shape, e.g. a hook 15 with an eye 16 (FIG. 2). The thickness of the material (metal) of the eye 16 (FIG. 2) shall at least in one area of the plane of development of the eye have a minimum value, which, when seen along the entire eye, is somewhat less than the distance a between the ears 12, 13 which define the entrance opening 18 of the shackle, suitably the measure of the metal thickness b (FIG. 4) of the intended chain. This minimum metal thickness may be a very local flattening or waist 17, as is indicated by the hatched cross sectional surface in FIG. 2, or be maintained along a greater part of the arc of the shackle. The flattening 17 shall have such an extension, that the eye 16 can just pass through the entrance opening 18 of the shackle at the flattening 17. This minimum metal thickness prevents introduction of the eye into a smaller shackle 10 than the intended one.

By dimensioning the measure f and m and radii l and k of the shackle (FIGS. 3 and 5–6) as well as the internal width e and the inner radius of curvature of the eye (FIG. 4) in such a way, that the measure f of the shackle after the introduction of the flattening 17 through the entrance opening 18 of the shackle into the vacant space 19 and subsequent rotation of the shackle, during which movement one of its ears passes through the eye, is just a little smaller than the measure e during part of the rotational movement, it is precluded that a shackle which is too big can be introduced into the eye. The measures e and f (FIG. 3) which vary during the rotational movement are defined as follows:

e is the internal measure, counted as the distance from the point of engagement S (which displaces itself) to the diametrically opposite inside of the shackle, as projected on the plane of extension p — p when one ear 12 or 13 of the shackle just passes into the eye 16 whereas the flattening 17 of the eye engages the shackle on opposite sides of the entrance opening 18 in the points S and T respectively.

f is the distance from the point of engagement S between the shackle and the inside of one ear to the top of the same ear of the shackle projected on the plane of development p — p of the eye when point contact occurs in S and T according to the definition of the measure e above.

Through this adaption, on one hand of the measure b at the flattening 17 (FIG. 2) to the measure a of the shackle in the entrance opening 18 between the ears 12, 13 and on the other hand of the measure e of the eye to the measure f of the shackle, it is accomplished that only shackles of the predetermined size can be coupled to the eye of the fitting.

In one embodiment the invention accordingly warrants a nonconfusible coupling together of chain — shackle — eye member or fitting eye.

As is evident from the above, one can in addition thereto make sure that two shackles can be introduced into each other only if they are of the same size by giving the internal width of the shackle proper the measure e according to the above definition and by providing one or more flattenings 17 having a minimum metal thickness b along the arcuate portion 11 of the shackle. Accordingly, such an adaption of chain — shackle — chain makes it impossible e.g. to couple together two chains with different dimensions. This gives a substantially increased safety in use.

The two abovementioned embodiments may be summarized as follows:

(1) The coupling of an end link of a chain to a fitting (e.g. a hook) which is provided with a particular eye, by the means of a shackle with a spindle, in which the diameter d of the spindle and the distance a between the ears 12, 13 in the entrance opening is so selected in combination with each other, that it permits the coupling of only one chain dimension to the shackle, and in which the fitting 15, which is provided with an eye 16, in at least one point of the arcuate portion of the eye has a flattening with a minimum metal thickness which is so dimensioned that the flattening can just pass into the shackle 10 through its entrance opening 18, and on the one hand at least one of the ears 12, 13 of the shackle, i.e. the shortest one, has such a shape in its upper portion (radius l, radius k, measure m) and on the other hand the width of the eye is so selected, that the ear of the shackle can just pass through the eye 16 of the fitting 15, the measures l, k, m, e and the inner radius of curvature in combination with each other make possible the coupling of only one shackle size to the eye of the fitting.

(2) The coupling together of two shackles according to point 1), in which the arcuate portion of each shackle at one or more points has a constriction or flattening 17 of a minimum metal thickness which is so dimensioned that it can just pass through the entrance opening of a second shackle, identical to the first one, and the inner dimension (the measure e) is so adjusted — suitably equal to the measure e of the eye of the fitting — that the shorter ear of one shackle can just pass into the vacant space defined by the other shackle, said measures — l, k, m according to point 1, the measure e of the shackle and its inner radius of curvature — in combination with each other render possible the coupling together of two shackles only if they have the same size.

In the embodiments described above it has been presupposed that the smallest transverse dimension is located substantially in the plane which is defined by the U-shaped shackle. Within the scope of the invention this transverse dimension may also be substantially perpendicular to said plane defined by the shackle. If then the opening of the eye (shackle) is made uniform to and somewhat greater than, or is in another way adjusted to the forms and dimensions of the (one) ear of the shackle, said ear may be introduced into the eye (shackle) without the necessity of rotating the latter. Hereby, it becomes possible to bring eye-members and shackles, whose dimensions lie within predetermined limits, into engagement with each other, which is, however, not possible if these limits are exceeded.

The embodiments described above and illustrated in the drawings are, of course, to be regarded merely as non-limiting examples and may as to their details be modified in several ways within the scope of the following claims. Thus, the invention may be applied to several different fields of the art.

What I claim is:

1. A coupling unit for coupling to the end link of a chain, said end link having an interior opening, said coupling unit comprising in combination a substantially U-shaped, substantially flat shackle for coupling to said chain end link through said interior opening, said shackle having two opposed spaced apart shanks provided with registered apertures near their free ends, and a removable locking spindle extending through said apertures in said shanks for coupling them together; an eye member having an at least substantially closed eye having a cross dimension with a major portion of cross dimension greater than the distance between said shanks and a minor flattened portion which is smaller than the distance between said shanks, whereby the flattened portion, subsequent to the removal of the locking spindle of said shackle, may be introduced between the shanks substantially beyond their apertures, the opening of the eye member being then threadable upon one shackle shank for accomplishing coupling together of shackle and eye; an adjacent link in said chain being connected to said end link, the width of the interior opening of said end link being proportioned to receive said locking spindle with close clearance, whereby to define a minimum dimension for said end link, the cross dimensions of said end link being smaller than the distance between said shackle shanks for permitting connection of said end link therebetween, whereby to prevent said shackle from being connected to a chain having an end link that is either too small or too large.

2. Coupling unit according to claim 1, wherein the opening of said eye member, when measured from said flattened portion of the eye member to another portion thereof which is located diametrically opposite to said flattened portion, is so wide that said other portion is pivotable past the outer end of a shackle shank at the same time as each one of two points on mutually opposite surfaces of said flattened portion slide upon different portions of the inner surface of the shackle.

3. Coupling unit according to claim 1, wherein the eye member is comprised of a shackle substantially identical to the first mentioned one.

4. Coupling unit according to claim 1, wherein said flattened portion is substantially perpendicular to the plane defined by said U-shaped shackle.

5. Coupling unit according to claim 1, wherein each of said shank ends has a composite end surface which is comprised of one convex, circular surface which is turned away from the other free shank end and one concave, circular surface which faces the other free shank end, said two circular surfaces being generated by generatrices which are substantially parallel to each other and perpendicular to the plane defined by the flat U-shaped shackle.

6. Coupling unit according to claim 1, wherein each shank end, when seen in a direction parallel to the common axis of said registering apertures, is wider than the remainder of the shackle and has a substantially semicircular end contour.

* * * * *